(12) United States Patent
Lundblad

(10) Patent No.: US 9,287,570 B2
(45) Date of Patent: Mar. 15, 2016

(54) PLANAR CONFIGURATION AIR BREATHING POLYMER ELECTROLYTE ELECTRICAL DEVICE INCLUDING SUPPORT PLATE AND BEARING PLATE

(75) Inventor: Anders Lundblad, Stockholm (SE)

(73) Assignee: MYFC AB, Stockholm (SE)

( * ) Notice: Subject to any disclaimer, the term of this patent is extended or adjusted under 35 U.S.C. 154(b) by 688 days.

(21) Appl. No.: 12/296,651

(22) PCT Filed: Apr. 5, 2007

(86) PCT No.: PCT/SE2007/050222
§ 371 (c)(1),
(2), (4) Date: May 26, 2009

(87) PCT Pub. No.: WO2007/117212
PCT Pub. Date: Oct. 18, 2007

(65) Prior Publication Data
US 2010/0035110 A1 Feb. 11, 2010

(30) Foreign Application Priority Data

Apr. 11, 2006 (SE) .................................. 0600816-3
Jun. 19, 2006 (SE) .................................. 0601342-9

(51) Int. Cl.
*H01M 8/02* (2006.01)
*H01M 8/04* (2006.01)
(Continued)

(52) U.S. Cl.
CPC .......... *H01M 8/0247* (2013.01); *H01M 8/0271* (2013.01); *H01M 8/0297* (2013.01);
(Continued)

(58) Field of Classification Search
CPC ............ H01M 8/0247; H01M 8/0271; H01M 8/0297; H01M 8/1097; H01M 8/241; H01M 8/2455; H01M 8/248; H01M 8/1002

USPC ......... 429/469, 483, 452, 455, 456, 458, 460, 429/462

See application file for complete search history.

(56) References Cited

U.S. PATENT DOCUMENTS 3,554,803 A 1/1971 Poirier
5,759,712 A 6/1998 Hockaday
(Continued)

FOREIGN PATENT DOCUMENTS

CN 1487611 A 4/2004
EP 1148564 A 10/2001
(Continued)

OTHER PUBLICATIONS

Canadian Office Action issued on Sep. 28, 2012 for corresponding Canadian Patent Application No. 2,648,766. (2 pages).

*Primary Examiner* — Sean P Cullen
(74) *Attorney, Agent, or Firm* — Pierce Atwood LLP; Kevin M. Farrell; Reza Sadr

(57) ABSTRACT

The present invention relates to a fuel cell device for use in planar configuration air breathing polymer electrolyte electrochemical devices and to a support plate, gas connection means and clamping means for use in the fuel cell device. The electrochemical device may be use as a fuel cell or an electrolyzer. In particular it relates to a planar configuration air breathing polymer electrolyte electrochemical device including at least two fuel cells arranged in series connection on one surface of a support plate, characterized in that the fuel cells (2', 2", 2'"; 943) are arranged to press against a bearing plate (218; 942), which has an area that is larger than the area of the support plate.

23 Claims, 13 Drawing Sheets

(51) Int. Cl.
*H01M 8/24* (2006.01)
*H01M 8/10* (2006.01)

(52) U.S. Cl.
CPC .......... *H01M 8/1002* (2013.01); *H01M 8/1097* (2013.01); *H01M 8/241* (2013.01); *H01M 8/248* (2013.01); *H01M 8/2455* (2013.01); *H01M 8/04037* (2013.01); *H01M 8/04201* (2013.01); *H01M 8/04268* (2013.01); *H01M 2250/30* (2013.01); *Y02B 90/18* (2013.01); *Y02E 60/521* (2013.01)

(56) References Cited

U.S. PATENT DOCUMENTS

| | | | |
|---|---|---|---|
| 6,268,077 B1 * | 7/2001 | Kelley et al. | 429/421 |
| 6,497,975 B2 * | 12/2002 | Bostaph et al. | 429/415 |
| 6,660,423 B2 * | 12/2003 | Neutzler et al. | 429/450 |
| 6,986,961 B1 | 1/2006 | Ren et al. | |
| 2002/0076599 A1 | 6/2002 | Neutzler et al. | |
| 2003/0198853 A1 * | 10/2003 | Choi et al. | 429/32 |
| 2004/0053100 A1 | 3/2004 | Stanley et al. | |
| 2004/0062965 A1 * | 4/2004 | Morse et al. | 429/30 |
| 2004/0161655 A1 | 8/2004 | Murphy et al. | |
| 2004/0224190 A1 | 11/2004 | Sasahara et al. | |
| 2006/0046124 A1 * | 3/2006 | Lai et al. | 429/34 |
| 2006/0065521 A1 | 3/2006 | Liu et al. | |
| 2007/0172709 A1 * | 7/2007 | Nakakubo | 429/18 |

FOREIGN PATENT DOCUMENTS

| | | |
|---|---|---|
| JP | 2002056855 | 2/2002 |
| JP | 2002056855 A | 2/2002 |
| JP | 2003317745 A | 11/2003 |
| JP | 2005100866 A | 4/2005 |
| JP | 2006086045 A | 3/2006 |
| JP | 2006508516 A | 3/2006 |
| KR | 1020030083511 | 10/2003 |
| WO | 2006041397 A1 | 4/2006 |
| WO | WO 2006041397 A1 * | 4/2006 |

* cited by examiner

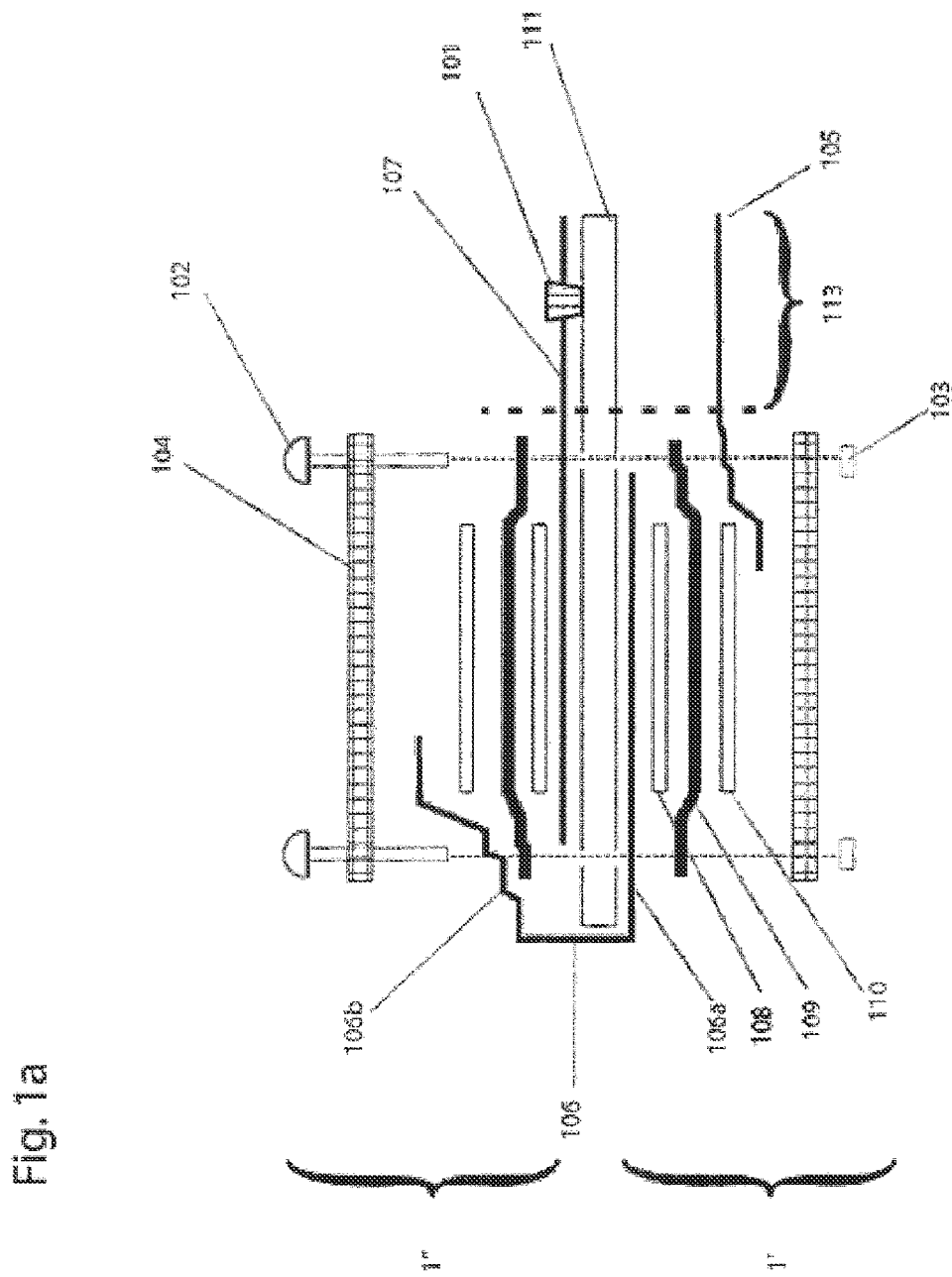

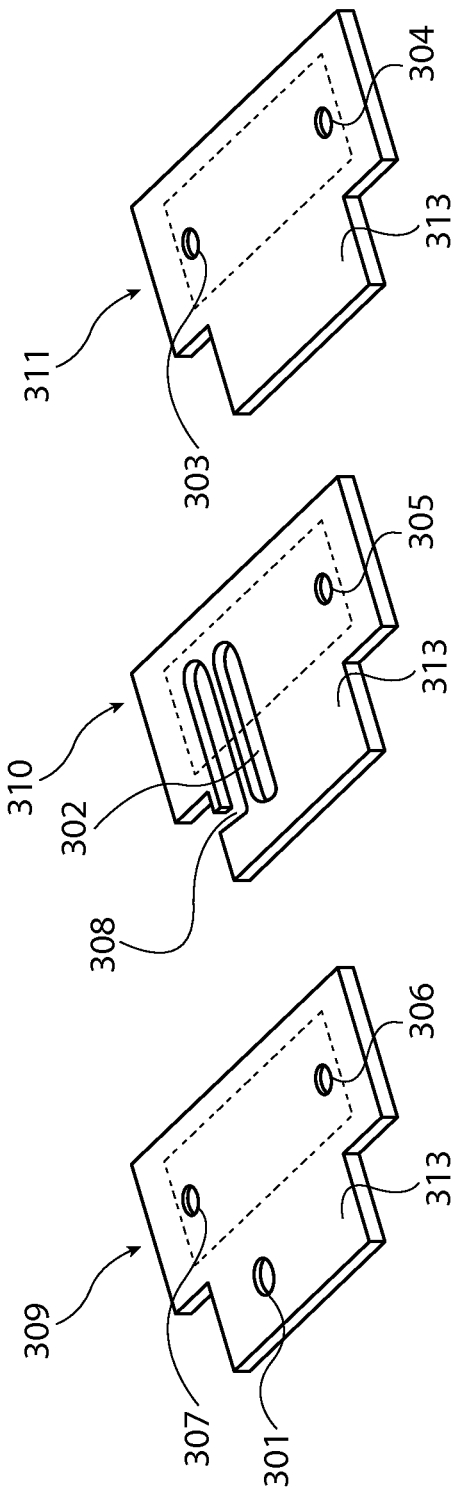

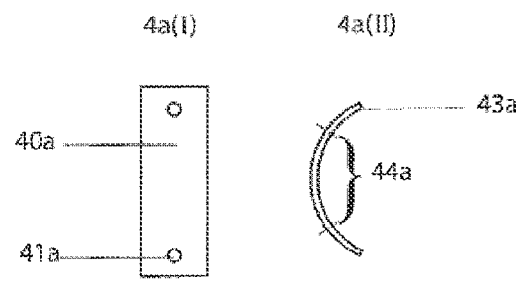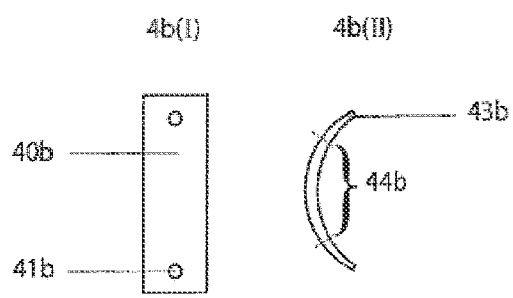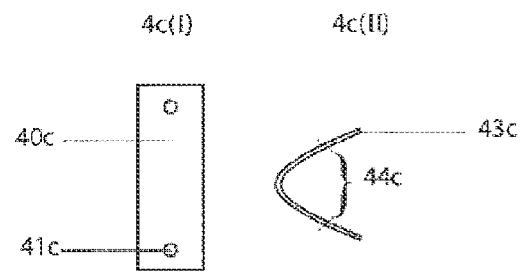

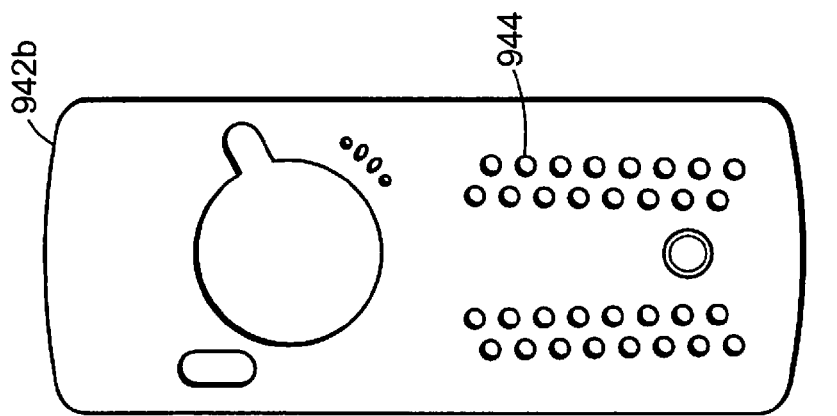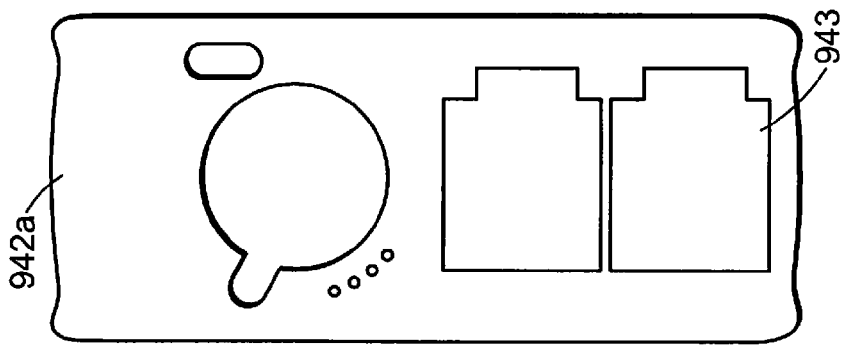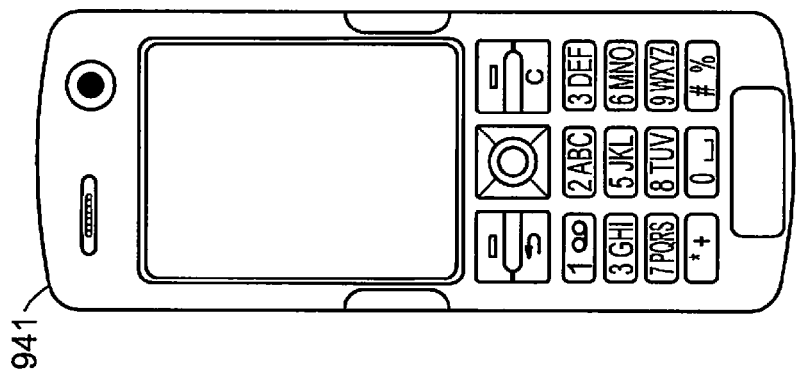
FIG. 11

PLANAR CONFIGURATION AIR BREATHING POLYMER ELECTROLYTE ELECTRICAL DEVICE INCLUDING SUPPORT PLATE AND BEARING PLATE

TECHNICAL FIELD

The present invention relates to a fuel cell device for use in planar configuration air breathing polymer electrolyte electrochemical devices and to a support plate, gas connection means and clamping means for use in the fuel cell device. The electrochemical device may be use as a fuel cell or an electrolyser.

BACKGROUND

Generally, a fuel cell is a device which converts the energy of a chemical reaction into electricity. Fuel cells differ from batteries in that fuel and oxidant are stored external to the cell, which can generate power as long as the fuel and oxidant are supplied. A fuel cell produces an electromotive force by bringing the fuel and oxidant in contact with two suitable electrodes separated by an electrolyte. An electrolyser is a device with the opposite function of a fuel cell. It converts electrical energy to chemical energy in the form of hydrogen and oxygen. In a polymer electrolyte fuel cell, a fuel such as hydrogen gas, is introduced at one electrode where it dissociates on the electrocatalytic surface of the negative electrode (anode) to form protons and electrons, as elucidated in equation 1. The electrons pass into the conductive structure of the electrode, and there from to the external electrical circuit energized by said fuel cell. The protons formed by dissociation of the hydrogen at the first electrode—pass through the electrolyte to the second electrode. Simultaneously, an oxidant, such as oxygen gas or air, is introduced to the second electrode where it is adsorbed on the electrocatalytic surface of the positive electrode (cathode) and is electrochemically reduced to form a surface oxide species by electrons having transversed the external electrical circuit energized by the fuel cell. This surface oxide reacts with protons from the electrolyte to form water, the product of the net reaction. The water desorbs from the electrode and leaves the cell in the cathode. Some of the formed water, being in condensed form, remain in the cathode and the hygroscopic membrane. The half cell reactions for a hydrogen consuming fuel cell at the two electrodes are, respectively, as follows:

$$H_2 \rightarrow 2H^+ + 2e^- \quad (1)$$

$$\tfrac{1}{2}O_2 + 2H^+ + 2e^- \rightarrow H_2O \quad (2)$$

Connecting the two electrodes through an external circuit causes an electrical current to flow in the circuit and withdraws electrical power from the cell. The overall fuel cell reaction, which is the sum of the separate half cell reactions written above, produces electrical energy and heat.

Although some applications may make use of a single cell, fuel cells are in practice often connected in a series to additively combine the individual cell potentials and achieve a greater, and more useful, potential. The cells in a given series can be connected directly, with opposing faces of a single component in contact with the anode of one cell and the cathode of an adjacent cell, or through an external electrical linkage. A series of fuel cells, referred to as a fuel cell stack, are normally equipped with a manifold system for the distribution of two gases. The fuel and oxidant are directed with manifolds to the correct electrodes, and cooling is provided either by the reactants or by a cooling medium. Also within the stack are current collectors, cell-to-cell seals, and other components. The stack and associated hardware make up the fuel cell module.

In fuel cells which use a solid polymer electrolyte, the membrane acts as the electrolyte as well as a barrier for preventing the mixing of the reactant gases. A PEM fuel cell is described in greater detail in Dhar, U.S. Pat. No. 5,242,764, which is incorporated herein by reference. Much research and development has been devoted to improving the power-to-weight ratio for proton exchange membrane ("PEM") fuel cells. Most of this research has involved increasing the power per unit volume of relatively heavy stacks.

The polymer electrolyte electrochemical device of the present invention is a small device. Unlike the situation for stationary or transportation applications (1-200 kW), the main motivation for developing small polymer electrolyte fuel cells (micro to hundreds of watts) does not reside in environmental benefits but in foreseeable improved technical characteristics compared to the established technologies which are, chiefly, primary and secondary batteries. Also, materials cost is a lesser barrier than in transportation applications since batteries are relatively expensive. The expected advantages of Polymer Electrolyte Fuel Cells (PEFC) against batteries are a higher energy density (Wh g-1) and no recharging time.

Hitherto, PEFC's have been developed chiefly for large cells where the benefits of having certain regulations (temperature, reactant flows and humidity) are not outweighed by the implied weight and electrical consumption of the associated ancillary components (cooling system, compressors and fans, humidifiers). More recently, efforts have been made to reduce the stack weight by replacing the heavy carbon elements with thinner and lighter, metal elements. However, these units were designed for large scale applications, some on the order of about 30 kW, and, therefore, require the same stack ancillary equipment mentioned above. Furthermore, the ancillary equipment included with the stack in these systems has been designed to operate efficiently at the kilowatt level. Scaled down versions of these systems have been attempted in applications that require much less power, such as within the range between about 50 and about 150 Watts. However, these systems are not well suited for stack outputs in the tens or hundreds of watts, since the rotating components, such as pumps and compressors, do not scale down well. As a result, even small scale systems of this design are too heavy for many small applications, such as for portable applications and personal use.

Therefore, the most important objective for portable and personal applications is perhaps not Watts per unit volume but Watts per unit weight, i.e. W/g and W/cm$^3$.

Small fuel cells must be designed to work with minimized control. The design has naturally shifted from stacks to planar cells, since planar cells offer enhanced heat removal and air access to the cathode. Any planar configuration implies in turn a mixed conductor/insulator pattern for serial connections. Serial connection between planar cells can be made in two ways. The first, which is often referred to as the banded design, consists of having cathodes arranged on either side and anodes on the opposite side and each cathode being connected to the anode of the next adjacent cell. The connection may be made by creating breaches in the central area of the membrane or by leading the current aside the active area beyond the membrane edge and making the connection there. The latter choice avoids cutting out through the membrane and in so doing avoids the fastidious tightening of each anode separately. The second way of making a serial connection of planar cells is often referred to as the flip-flop design, and involves construction of two cell-house plates, each having cathodes and anodes alternated along its surface. A cathode of one cell is then electrically connected to an anode of the next cell. Passive PEFCs do require membranes having small resistance, regardless of the design chosen for the in-plane serial connection, even if the water originates only from the fuel cell reaction. This fact calls for thin membranes as long as fuel crossover is not a concern. If the PEFC works on average at current densities of 200 mA cm-2 or more, fuel crossover is not a concern and the membrane thinness is limited only by its mechanical integrity.

Three types of materials and their associated technologies have so far been investigated for small PEFCs:
(i) Miniaturization of conventional PEFC design with graphite or stainless steel plates for the current collectors and cell housing;
(ii) Silicon technology; either patterning of conductive/non-conductive path on silicon wafers or development of methods to create in the wafer a complex architecture of porous silicon layers on top of channels for the reactant gases;
(iii) Printed Circuit Board (PCB) technology; use of a thin layer of copper on electrically insulating composite materials.

The present invention is not restricted to these technologies, since it only requires a gas supplying support plate, which can be made from any sufficiently gas tight material (e.g. metals, plastics or even paper or paper composites).

There is a whish to improve and to simplify fuel cells. Some attempts have been made, that involve partial replacement of the clamping means by adhesive bonding. One method is described in US 2004/0161655, which discloses the assembly of a electrochemical stack by adhesively bonding the non-active perimeter of a membrane electrode assembly to the perimeter frame of one side of a bipolar plate, using a desired number of membrane electrode assemblies and bipolar plates. A thin layer of curable or thermoplastic adhesive is placed on the sealing areas, and the cell frames and membrane electrode assemblies are pressed together until the adhesive is fully cured and bonds the cell frames and the membrane electrode assemblies together. In this method care must be taken to ensure that the membrane and electrode assemblies are oriented properly so that the cathode side of one membrane and electrode assembly faces the cathode side of a bipolar grid or bipolar plate to which the membrane and electrode assembly is being bonded. Furthermore, adhesive must be carefully applied to the perimeter of any features on the bipolar element, such as, for example, a flow field, a manifold, a channel and combinations thereof to provide the necessary fluidic seal keeping reactant fluids, cooling fluids, or heating fluids confined to their respective areas. Moreover, cell stack produced by this method will still need a clamping force, especially for larger cells.

Therefore, there is a need for a lightweight fuel cell system that provides an improved power density and eliminates much of the ancillary equipment. There is also a need for high performance fuel cells or electrolyser that are simple to produce and convenient to handle. The object of the present invention is thus to provide an improved electrochemical device that can function as a fuel cell or an electrolyser. Another object of the present invention is to provide an electrochemical device which allows easy replacement of the active component.

The above objects are achieved in a patent application PCT/SE2005/001514, published as WO 2006/041397 where the fuel cell is formed by adhesively attaching an active component (current collectors, GDLs and MEA) to a support plate. The invention described below refers to important improvements of that invention and also improving other planar configuration fuel cells.

SUMMARY OF THE INVENTION

A polymer electrolyte electrochemical device is in the context of the present application an electrochemical device having an ion conducting polymer membrane electrolyte, for example a proton conducting membrane, or a polymer membrane made by a polymer matrix immobilizing a liquid electrolyte, for example immobilised KOH and H2O. Examples of such devices are hydrogen fed polymer electrolyte fuel cells, direct methanol fuel cells, and polymer electrolyte electrolysers. For simplicity, the following text refers to the anode and the cathode of a fuel cell, but as a person skilled in the art would understand these notations should be swapped when referring to an electrolyser.

The electrochemical device of the present invention comprises an anode current collector, a membrane electrode assembly with anode and cathode gas backings, and a cathode current collector. The electrochemical device is preferably designed for use in a multiple cell serial connection arrangement.

In one aspect of the invention a planar configuration air breathing polymer electrolyte electrochemical device is provided, which includes at least two fuel cells 2', 2" arranged in series connection on one surface of a support plate 211. The fuel cells 2', 2" are arranged to press against a bearing plate 218, which has an area that is larger than the area of the support plate. The bearing plate 218 preferably includes gas permeable portions 217 located in the area of each fuel cell 2', 2", preferably has an arcuate form. The plate 218 is preferably an arcuate or curved casing of a product, such as a mobile phone.

In a preferred embodiment the support plate 211 comprises at least three layers in a sandwich structure, wherein a first outer layer comprises a fuel gas inlet 201, an intermediate layer comprises apertures 221, 224 which form gas channels, and a second outer layer comprises openings 222, 223 for inlet and outlet of gas into and from a fuel cell gas chamber of each fuel cell. Gas connection means is preferably provided at one end of the support plate.

Each of said fuel cells preferably comprises an anode current collector 207, 206', 206", an anode gas diffusion layer 208, a cathode gas diffusion layer 210, a cathode current collector 206', 206", 205, and a membrane electrode assembly 209. The membrane electrode assembly comprises a solid ion conducting polymer membrane electrolyte, an anode, and a cathode, and the membrane electrode assembly 209 and the gas diffusion layers 208, 210 are arranged between the anode current collector 207, 206' and the cathode current collector 206', 206", such that the anode gas diffusion layer is directed towards and attached to the anode current collector, so as to define an anode gas chamber, and the cathode gas diffusion layer is directed towards and attached to the cathode current collector.

The membrane electrode assembly is preferably sealed and attached directly to the anode current collector by means of an adhesive, which adhesive covers a first region, adjacent and corresponding to the anode gas backing, and a second region, which surrounds the first region, thereby creating a seal between the membrane electrode assembly and the anode current collector, and thus creating an anode gas chamber, said adhesive being electrically conductive in at least said first region.

In another aspect invention a planar configuration air breathing polymer electrolyte electrochemical device is provided, which includes at least two fuel cells 1', 1" arranged in series connection on a support plate 111. The fuel cells 1', 1" are arranged in pairs on opposite surfaces of the support plate. In preferred embodiment the support plate 111 comprises at least three layers in a sandwich structure. A first outer layer 309 comprises a fuel gas inlet 301, an intermediate layer 310 comprises apertures 302 which form gas channels (e.g., outlet channel 308), and a second outer layer 311 comprises openings 303, 304 for inlet and outlet of gas into and from the fuel cell gas chamber. The support plate preferably also comprises a main support plate portion 112 on which the fuel cells 1', 1" are arranged, and an end plate portion 113, 313. The cathode current collector 105 of the first fuel cell 1' and the anode current collector 107 of the last fuel cell 1" extend to the surface area of the end plate portion 113, 313, which is adapted for connection to a current collector contact. Gas connection means is preferably provided on the end plate portion of the support plate.

In another preferred embodiment the device is provided with clamping means, which has the form of an arcuate clamping bar or clamping plate.

Each of said fuel cells 1', 1" of the device preferably comprises an anode current collector 106a, 107, an anode gas diffusion layer 108, a cathode gas diffusion layer 110, a cathode current collector 105, 106b, and a membrane electrode assembly 109. The membrane electrode assembly comprises a solid ion conducting polymer membrane electrolyte, an anode, and a cathode, and the membrane electrode assembly 109 and the gas diffusion layers 108, 110 are arranged between the anode current collector 106a, 107 and the cathode current collector 105, 106b, such that the anode gas diffusion layer is directed towards and attached to the anode current collector, so as to define an anode gas chamber, and the cathode gas diffusion layer is directed towards and attached to the cathode current collector.

The membrane electrode assembly is advantageously sealed and attached directly to the anode current collector by means of an adhesive, which adhesive covers a first region, adjacent and corresponding to the anode gas backing, and a second region, which surrounds the first region. Thereby a seal is created between the membrane electrode assembly and the anode current collector, and thus an anode gas chamber is created. The adhesive is electrically conductive in at least said first region.

The present invention also relates to a current collector contact for connection of the above planar configuration air breathing polymer electrolyte electrochemical device. The contact comprises a contact recess 703 in which contact means 704 are provided, so as to come in contact with the anode current collector 107 and the cathode current collector 105 when the end plate portion 313 of the support plate 111 of the electrochemical device is inserted in the aperture.

The present invention also relates to a clamping device 4a, b, c for clamping of a fuel cell. The clamping device comprises a clamping bar 40a, b, c has means 41a, b, c at its end portions 43a, b, c for receiving mounting elements, for fastening and tightening the clamping device against the fuel cell, and the clamping bar has an arcuate shape.

The clamping bar 40a, b, c preferably has a higher bending resistance at a centre portion 44a, b, c than the end portions 43a, b, c. In one embodiment the clamping bar 40a has a uniform thickness and is made of a material having a non-uniform material stiffness, such that the centre portion 44a has a higher stiffness than the end portions 43a. In another embodiment the clamping bar 40b has a uniform material stiffness and a non-uniform thickness, such that the centre portion 44b has a higher thickness than the end portions 43b.

In yet another embodiment the clamping bar 40c has a uniform thickness and a non-uniform arcuate shape, such that the centre portion 44c has a higher bending curve than the end portions 43c.

The means 41a, b, c for receiving mounting elements is preferably an opening located at each end portion of the clamping bar 40a, b, c.

According to a further embodiment a clamping device 4d is provided, which comprises a clamping plate 40d provided with openings for air access and which has means 41d at its corner portions 43d for receiving mounting elements, for fastening and tightening the clamping device against the fuel cell. The clamping plate is curved such that the centre portion 44d is bent in two perpendicular directions.

According to a further embodiment a clamping device 4e is provided, which comprises a clamping plate 40e, and has a front side 47, which is substantially flat, and a back side 48. the clamping plate comprises a solid portion 45 and an apertured portion 46. The apertured portion consists of a resilient material and is arcuate or curved such that a centre portion 44e of the apertured portion bulges in the direction of the back side 48.

The invention also relates to a fuel cell comprising any of the above described clamping devices.

The present invention also relates to a fuel cell support plate, which comprises a fuel inlet channel and an outlet channel 308. The fuel inlet channel has an inlet opening 301 for connection to a fuel supply and an outlet opening 303 for connection to a fuel cell anode gas chamber. The support plate comprises at least a first outer layer 309, an intermediate layer 310, and a second outer layer 311 in a sandwich construction, and the fuel inlet channel is confined by an elongated aperture 302 in the intermediate layer 310, in combination with the surfaces of the first and second outer layers 309, 311. The inlet opening 301 is arranged in the first outer layer 309, adjacent to one end of the elongated aperture 302, and the outlet opening 303 is arranged in the second outer layer 311, adjacent to the other end of the elongated aperture. In a preferred embodiment the support plate further comprises a fuel transfer channel for conduction of fuel from one side of the support plate to the opposite side of the support plate. The support plate preferably also comprises a current collector portion for connection to a current collector contact, which current collector portion extends from the support plate. The inlet opening 301 of the fuel inlet channel is advantageously provided in the current collector portion.

DRAWINGS

FIG. 1a is cross-sectional view of a fuel cell device according to a first embodiment of the invention;

Figure 4D:
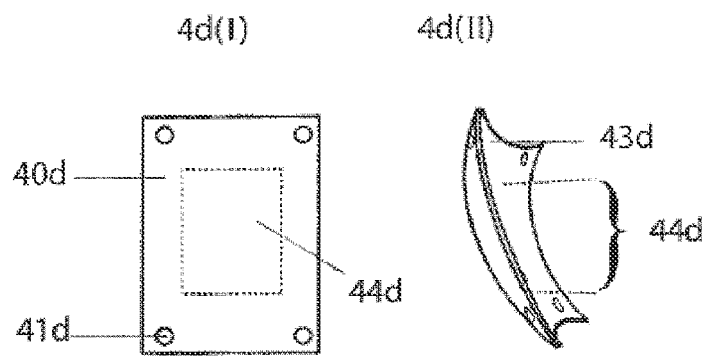
Figure 4E:
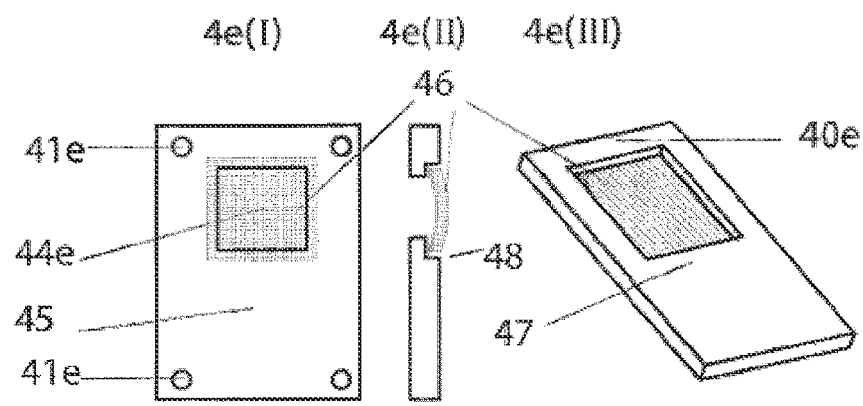
Figure 5:
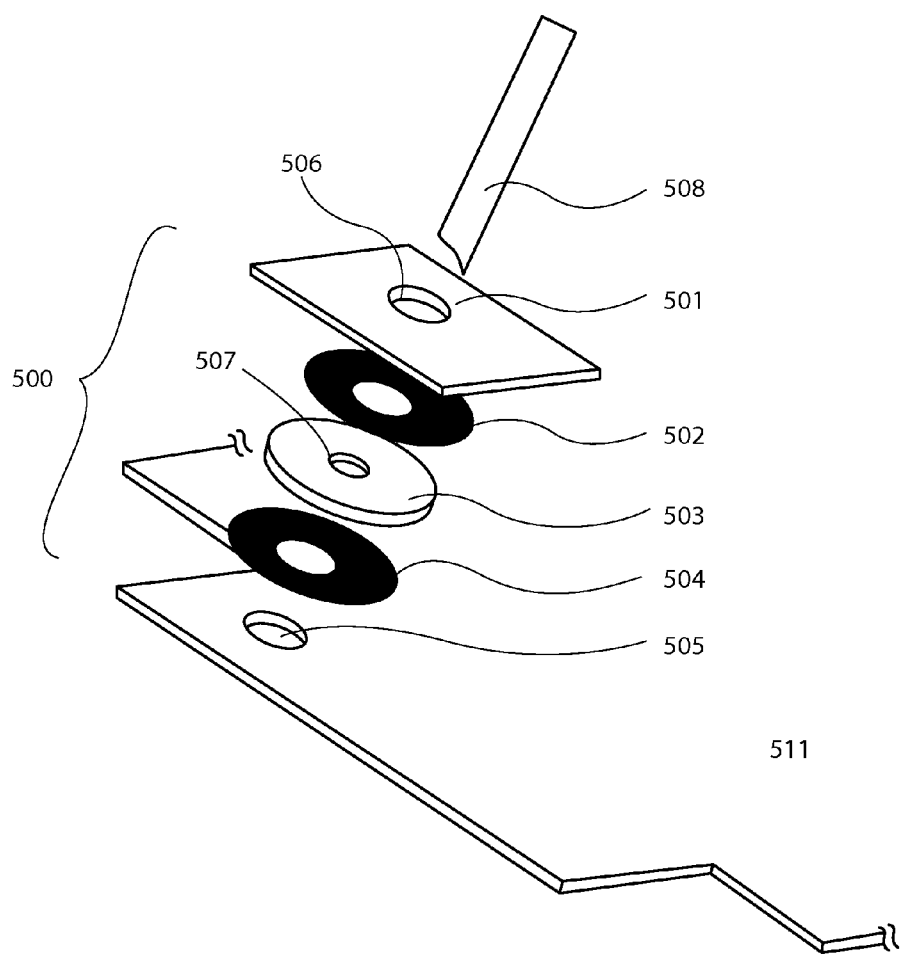
Figure 6A:
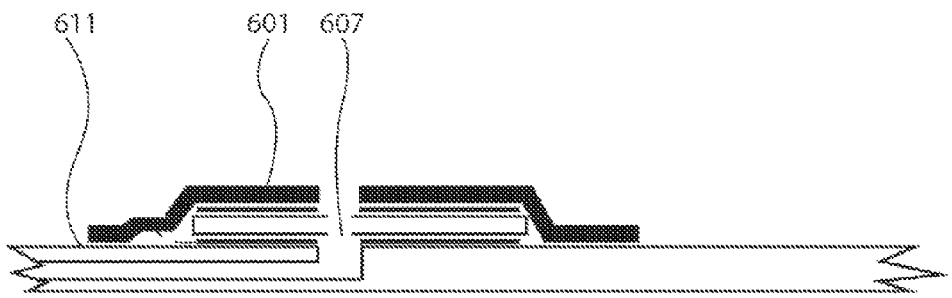
Figure 6B:
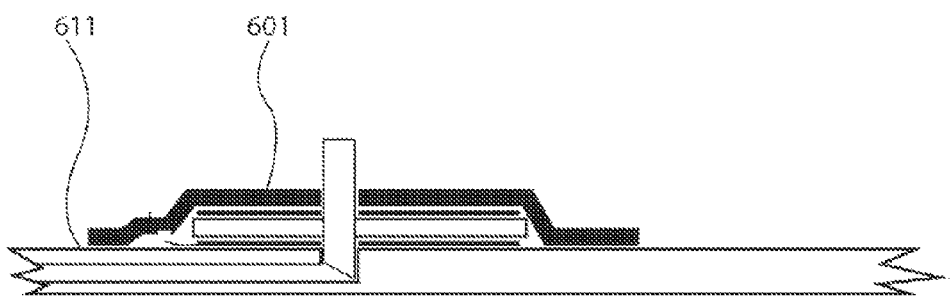

FIG. 3a-c is a side elevational view of components of a fuel cell device support plate;

FIG. 4a is a top view 4a(I) and a cross-section 4a(II) of one embodiment of a clamping device; FIG. 4b is a top view 4b(I) and a cross-section 4b(II) of another embodiment of a clamping device;

FIG. 4c is a top view 4c(I) and a cross-section 4c(II) of a further embodiment of a clamping device;

FIG. 4*d* is a top view 4*d*(I) and a perspective view 4*d*(II) of yet another embodiment of a clamping device;

FIG. 4*e* is a top view 4*e*(I), a side view 4*e*(II) and a perspective view 4*e*(III) of yet another embodiment of a clamping device;

FIG. 5 is an exploded side elevational view of a gas connector means;

FIG. 6*a-b* are cross-sectional side views of the gas connector means shown in 4.

Figure 7A:
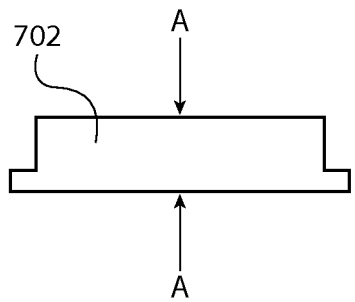
Figure 7B:
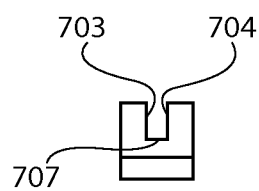
Figure 7C:
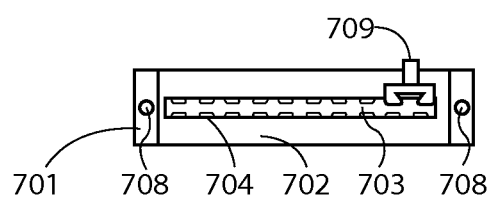
Figure 8A:
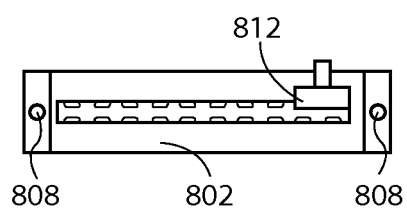
Figure 8B:
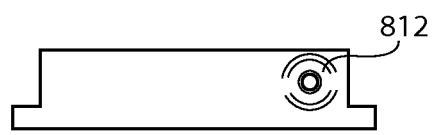
Figure 9:
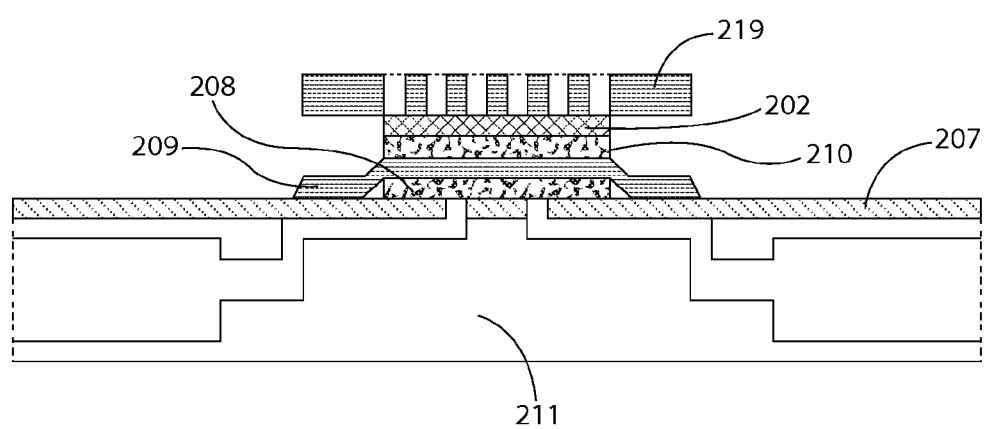
Figure 10A:
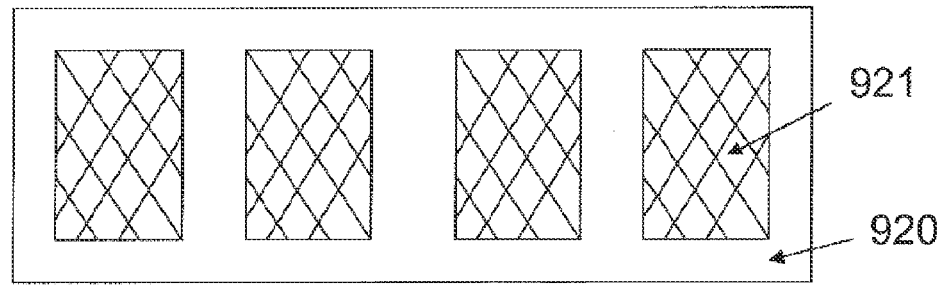
Figure 10B:
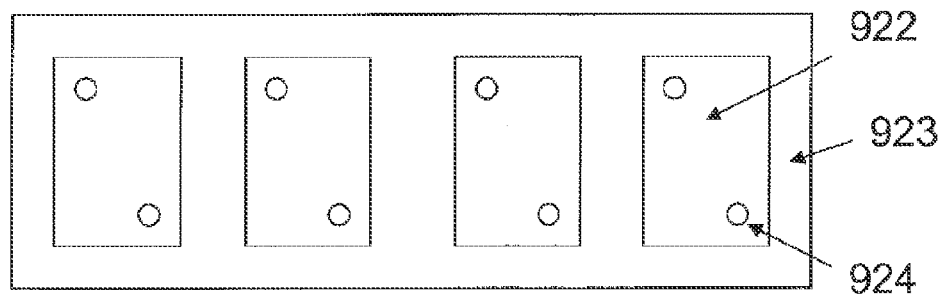
Figure 10C:
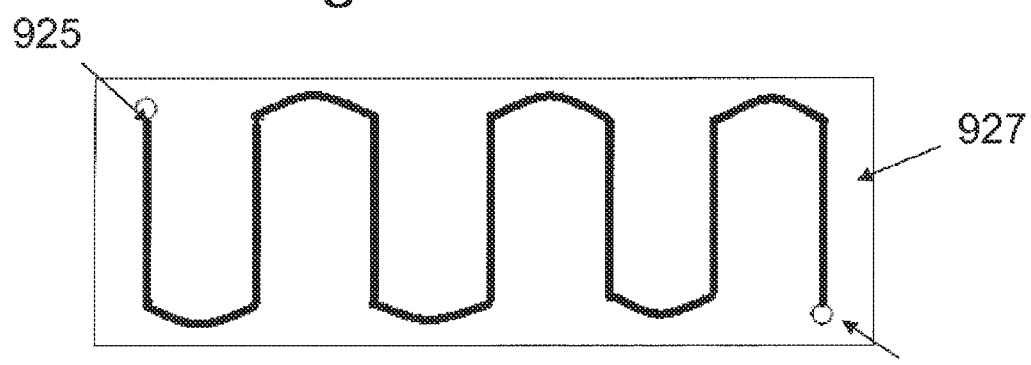

FIG. 7*a* is a side view of a current collector contact also having a gas connector;

FIG. 7*b* is a cross-sectional side view across the line A-A in FIG. 7*a*; FIG. 7*c* is a top view of the current collector contact in FIG. 7*a*;

FIG. 8 is another embodiment of a current collector contact which shows the design of a gas connector means having a circular silicon fitting or o-ring as a gas seal, 812; FIG. 8*a* is a top view of the current collector contact; FIG. 8*b* is a side view of a current collector contact;

FIG. 9 is an cross-sectional side view of a fuel cell device of the prior art;

FIG. 10*a* is a top view of the top layer of a support plate;

FIG. 10*b* is a top view of the middle layer of a support plate;

FIG. 10*c* is a top view of the bottom layer of a support plate; and

FIG. 11 is a schematic illustration of a fuel cell device being placed inside of a mobile phone chassis.

DETAILED DESCRIPTION

A planar configuration air breathing polymer electrolyte fuel cell is described in the international application PCT/SE2005/001514. This fuel cell, which is shown in FIG. 9 of the present application, comprises an anode current collector 207, a membrane electrode assembly 209 with anode and cathode gas diffusion layers 208, 210, and a cathode current collector. The membrane electrode assembly is sealed and attached to the anode current collector by adhesive means, thereby creating an anode gas chamber. The anode gas backing is provided on the lower side of the membrane electrode assembly, and the cathode gas backing is provided on its upper side. The anode current collector comprises a support plate 211 to which is attached an adhesive tape, which comprises a conductive foil, having an upper side facing the membrane electrode assembly, and a lower side being in contact with the support plate. Both sides of the foil have an adhesive coating, which is electrically conducting on the side facing the membrane electrode assembly. The membrane electrode assembly is sealed against the anode current collector by means of the adhesive coating on the upper side of the conductive foil. The cathode current collector comprises conductive gold plated stainless steel mesh 202 and a clamping bar 219. The clamping bar comprises a printed circuit board plate provided with apertures for air access.

There is a continuous ambition to increase the power density of the fuel cell, i.e. the power output/cell volume or cell weight, and therefore there is a need for fuel cell devices of a more simple and compact design.

The object of the present invention is to provide an improved fuel cell device, which does not suffer from the above problems.

In the prior art fuel cell device the support plate must have a certain thickness in order to be stiff enough to withstand the bending forces applied by the clamping bar. The ambition to achieve increased power density, mentioned above, leads to the need of an alternative design for a fuel cell, which can provide higher power density.

The fuel cell device of the invention in a general aspect comprises at least two fuel cells in series connection, which fuel cells are arranged on a support plate.

FIG. 2 shows an embodiment of the fuel cell device according to one aspect of the invention, which device comprises a number of fuel cells, which are series connected and arranged side by side on one surface of the support plate 211, thereby forming a single sided fuel cell device. Three cells are shown in FIG. 2, but it should be noted that any desired number of cells may be arranged in the device of this embodiment. The fuel cells in FIG. 2 are referred to as first 2', second 2", and third 2'" fuel cells. Each fuel cell comprises an anode current collector foil, an anode GDL 208, a MEA 209, a cathode GDL 210, a cathode current collector foil, and an air pervious clamping component 204. Gas chambers are formed in the fuel cells in the same manner as in the embodiment shown in FIG. 1, and the gas chambers are sealed by adhesive means. The clamping component may be in the form of a net, or a plate or foil having apertures. The clamping component may also have an arcuate or bent shape. The fuel cells are arranged to press against a bearing plate 218, which may have the shape of a frame including openings or apertured regions 217 in the area of each fuel cell. The area of the bearing plate is larger than the area of the support plate. The bearing plate is preferably the inner surface of a mobile phone casing. In a most preferred embodiment the bearing plate has an arcuate shape, which may be concave or convex. The bearing plate may also have a bent shape, similar to any of the clamping plates shown in FIG. 4. The support plate and the fuel cells are attached and pressed against the bearing plate by means of snap connections or by being clamped to other components which are present in a product (e.g. a mobile phone) under the support plate, i.e. on the side of the support plate opposite to the side bearing the fuel cells.

The fuel cells are series connected by means of the arrangement of the current collector foils. The current collector foil 206' functions as cathode current collector for the first cell 2' and as anode current collector the second cell 2", and the current collector foil 206" functions as cathode current collector for the second cell 2" and as anode current collector the third cell 2'".

Figure 2A:
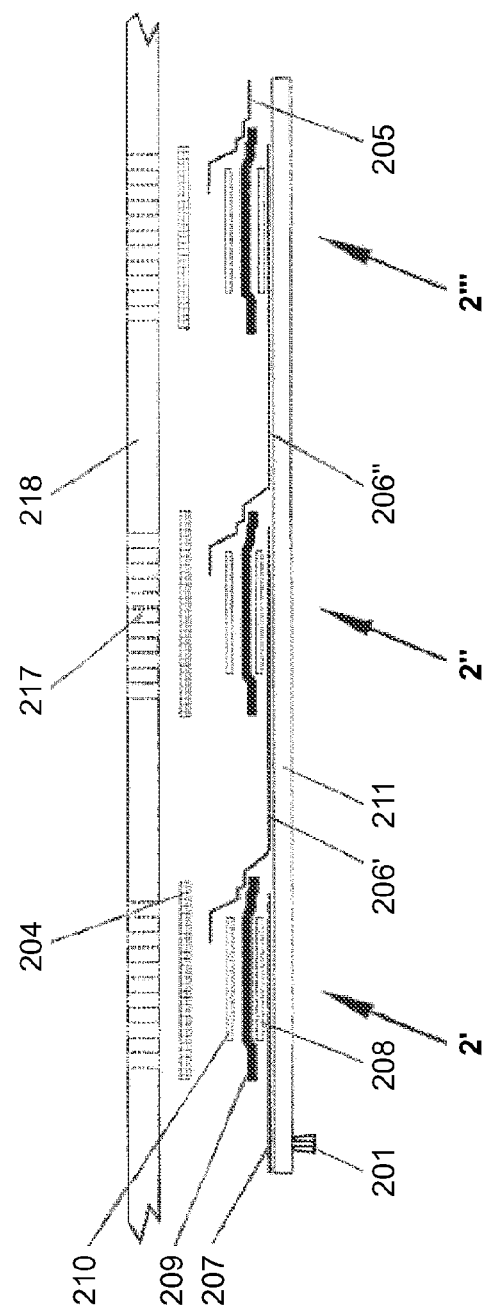
FIG. 2a is cross-sectional view of a fuel cell device according to a second embodiment of the invention.
Figure 2B:
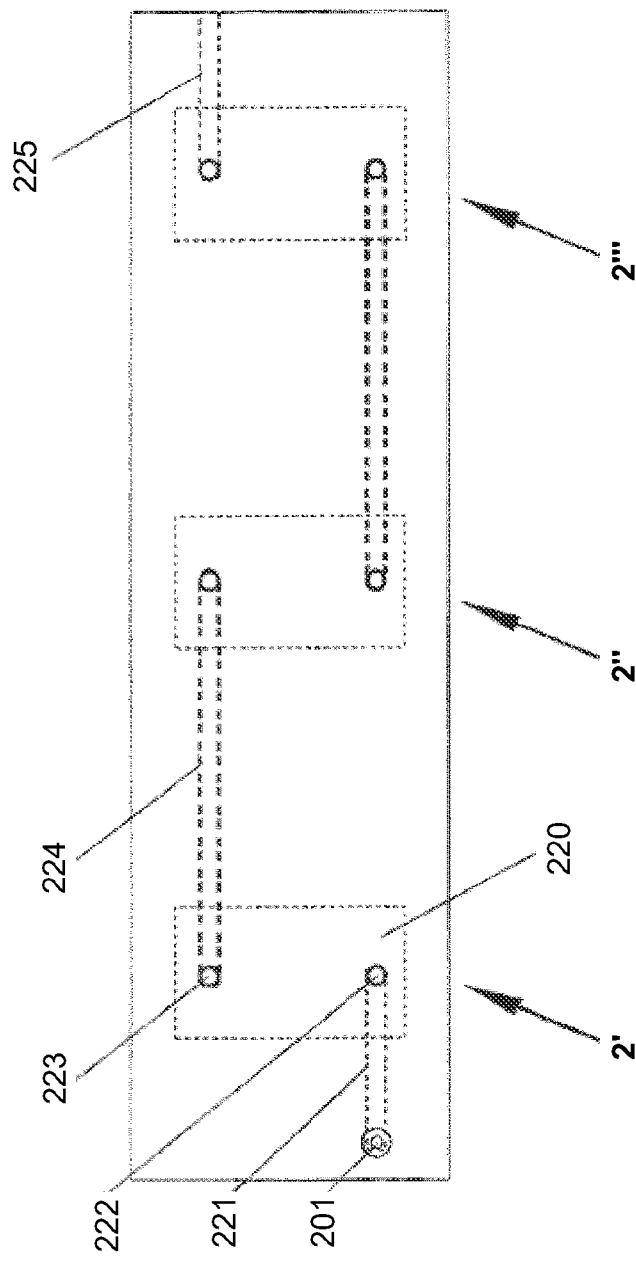
FIG. 2b is an upper view of a support plate for use in the device of FIG. 2a, in which gas chambers and gas channels are indicated by dashed lines.

The support plate, shown in FIG. 2*b*, comprises at least three layers, wherein a first outer layer comprises a fuel gas inlet 201, an intermediate layer comprises apertures 221, 224 which form gas channels, and a second outer layer comprises openings 222, 223 for inlet and outlet of gas into and from a fuel cell gas chamber of each fuel cell. Fuel gas is conducted from the gas inlet opening 201 through a gas channel formed by aperture 221, and enters the gas chamber formed between the anode current collector and the MEA of the first fuel cell 2' through the opening 222. The fuel gas flow is lead through the gas chamber and leaves through the opening 223 and is then further conducted to the gas chamber of the next fuel cell 2". Finally, the gas flow leaves the device through the fuel gas outlet channel 225 in the support plate. Gas connector means, preferably of the type described below in FIGS. 4 and 5 may be provided on the support plate in connection with the gas inlet opening 201. The anode chamber area of the first cell 2' is indicated by a dashed line (220).

An increased power density is achieved according to another aspect of the present invention by the provision of a fuel cell device which comprises a support plate having fuel cells applied on both sides, so as to form a double sided fuel cell device. Both fuel cells comprise all components needed for a fuel cell, but they have a common support plate. Both fuel cells are clamped by clamping devices on their outward surfaces, and the bending forces exerted by the clamping devices thereby counteract each other. The mechanical stress on the support plate is decreased and thereby also the stiffness requirements. Thus a support plate of lower thickness may be used. Such a double sided fuel cell device can further be series connected with additional double sided fuel cell devices, so as to form a multi fuel cell device. Because the support plate is utilized on both sides a higher power density of the fuel cell device is achieved.

Another solution to the problem of achieving an increased power density is provided by a fuel cell device according to another aspect of the present invention. According to this an improved fuel cell device comprises a thin support plate, from here on also called a support foil, comprising gas channels for the provision of fuel gas to the fuel cell device. A fuel cell is arranged on one side of the support foil. The support foil preferably comprises three or more layers in a sandwich structure. The support foil is preferably very thin, about 0.3-1 mm and need not have sufficient mechanical stiffness to withstand the clamping forces. The support foil is backed up by a stiff plate or bar on the back-side of support foil and is clamped on one side with a clamping bar or clamping plate.

Yet another solution to the problem of achieving an increased power density is provided by a fuel cell device according to a further aspect of the present invention. The device of this aspect comprises a support foil as the one described above. In this embodiment, the support foil is not backed up, but instead the cathode gas diffusion layer (GDL) is pressed against a stiff plate, having a larger area than the support foil and which is includes openings to provide gas access to and from the cathode. This plate may for example be the inside of a mobile phone chassis. This solution thus provides an improved flexibility of placing the fuel cell device inside another product.

Figure 1B:
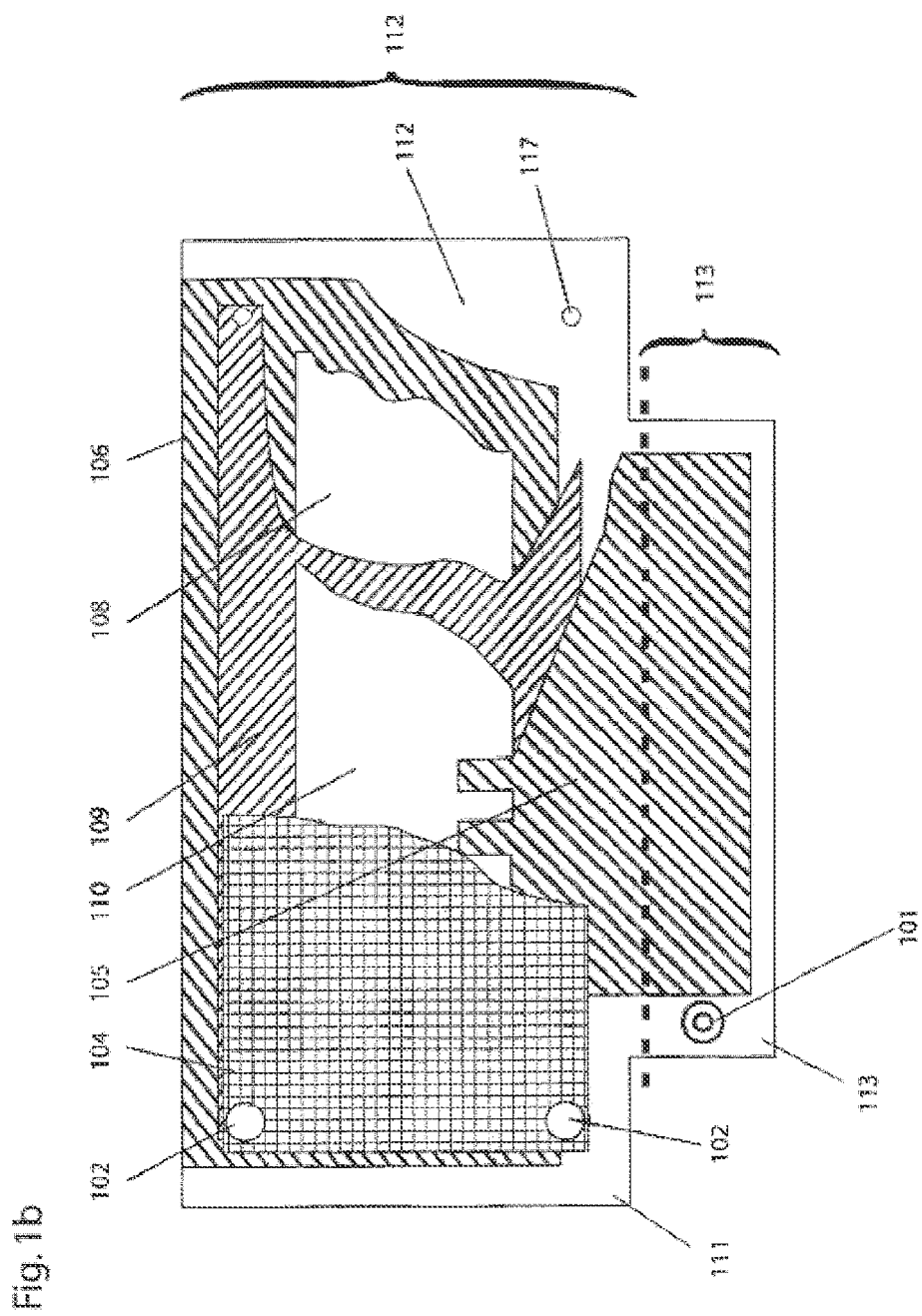
FIG. 1b is a partially cut out horizontal view of the device illustrated in FIG. 1a, seen from below.

FIG. 1a shows a cross-sectional exploded view of one embodiment of the fuel cell device according to a first aspect of the invention. FIG. 1b shows a partly cut out view of this embodiment, seen from below according to FIG. 1a. The fuel cell device comprises two series connected cells 1' and 1" arranged on opposite sides of a support plate 111, so as to form a double sided fuel cell device. The two fuel cells are of similar construction, so that each cell comprises an anode current collector foil, an anode GDL (gas diffusion layer), a MEA (membrane electrode assembly), a cathode GDL, a cathode current collector foil, and a clamping device. Gas chambers are formed between the anode current collector foils and the MEAs, by means of the gas diffusion layers. The active area of the cell thus corresponds to are area of the GDL, and typically has the dimensions of around 1.5×5 cm. In FIG. 1a the first fuel cell 1' is shown below the support plate 111, whereas the second fuel cell 1" is shown above the support plate. It should, however, be noted that the fuel cell device may be turned in any direction, and that the words "above"/"below" and "upper"/"lower" are used only for simplicity of the description.

The first lower cell 1', thus comprises an anode current collector foil 106a, an anode GDL 108', a MEA 109', a cathode GDL 110', a cathode current collector foil 105, and a clamping device, which includes a clamping net 104'. The second upper cell 1" comprises an anode current collector foil 107, an anode GDL 108", a MEA 109", a cathode GDL 110", a cathode current collector foil 106b, and a clamping device 104, which includes a clamping net 104". The gas chambers formed between the anode current collector foil and the MEA of each cell are sealed by an adhesive layer, and the current collector foils 105, 106, 107 are adhesively attached to their adjacent components. The whole assembly is clamped by clamping means, such as screws or bolts 102 and nuts 103 mounted in openings 117. It is important to obtain an even clamping pressure over the fuel cell assembly, in order to achieve an even and low intrinsic electrical resistance over the whole active area, i.e. the area corresponding to the GDL. For this purpose a bent clamping device as shown in FIG. 4d or 4e is preferred.

The cells are series connected by means of the current collector foil 106 being a component of both cells 1', 1", such that it is arranged as the anode current collector foil 106a in the first cell 1', folded around the support plate 111 and arranged as the cathode current collector foil 106b in the second cell 1".

The support plate 111 comprises a main support plate portion 112, on which the active area of the fuel cell device is positioned, i.e. the area of the gas chambers formed between each anode current collector foil and the anode GDL; and an end plate portion 113, which supports current collector foils of the cells 1', 1", and which is adapted for insertion in a current collector contact. By this construction the first anode (negative pole) current collector of the device is positioned on the opposite side of the last cathode current collector of the device (positive pole). This double sided plate, from herein called the end plate portion, can easily be mounted into a push-in contact for leading the electrical current.

Such a current collector contact is shown in FIGS. 7a, 7b, 7c and 8a, 8b. The support plate comprises means 101 for connection to a gas supply, such as a gas capillary, positioned in the end plate portion 112, and a gas channel formed by elongated aperture 302 (see FIG. 3) for conducting fuel gas to the anode chamber of the first fuel cell 1'. The gas passes through the gas chamber of the first cell and is then led through an opening 304, 305, 306 in the support plate into the gas chamber of the second fuel cell 1", before it exits the fuel cell device through an outlet channel 308. The support plate is preferably of the type as described below.

The gas supply to the cells of the fuel cell device can either be parallel or series connected or a combination thereof. When having cells with a small pressure drop experienced during operation, it is advantageous to connect the gas supply in series. This is because if a gas hindrance event occurs, for example due to condensation of a water droplet in a gas channel, an overpressure will build up from the fuel (e.g. hydrogen) source that pushes the water droplet out of the channel. However, if the pressure drop over a number of cells is too high during operation, then the overpressure occurring in the first cell can cause gas leakage. In that case it is better to connect the gas supply in parallel or in a combination of series and parallel.

Although FIG. 1a shows a fuel cell device comprising two series connected fuel cells, it should be apparent that the fuel cell device can contain any even number of fuel cells, and with a slight modification also an odd number of cells. The output voltage of the device can thus be selected over a wide range of voltages.

One advantage obtained by the double sided fuel cell device is that it has higher power density, since the support plate is utilized on both sides. Another advantage is that the support plate can be made thin, since the device is clamped on both sides by clamping bars or clamping plates where the bending forces are counteracting each other.

FIG. 11 is a schematic illustration of a fuel cell device being placed inside of a mobile phone chassis including a mobile phone front 941, an inside of a mobile phone back plate 942a, an outside of a mobile phone back plate 942b, a fuel cell device 943 pressed to the inside of the mobile phone back plate, and air inlet holes 944.

Clamping Bar

The components of a fuel cell device normally need to be clamped together. Low internal resistance is a key parameter for improving the performance of any fuel cell device. The internal resistance is the total intrinsic resistance of the components of the device, i.e. the resistance of the active layer and the GDL, the membrane and the contact resistance. In general the application of a clamping force on a fuel cell can serve two purposes:

i) by compressing the gas diffusion layer (GDL) and pressing the components against each other (e.g. the current collector against the GDL and/or the GDL against the membrane electrode assembly (MEA)), the intrinsic electrical resistance of the GDL and between the components (i.e. contact resistances) will decrease;

ii) the clamping pressure contributes to correct function of the seal surrounding the clamping area.

In fuel cells where sealing of the anode compartment is accomplished by use of adhesive, while the oxygen side is open to the air, as described in the patent application PCT/SE2005/001514, clamping is not needed for sealing purposes, but contributes to a decrease of the intrinsic electrical resistance (i) above).

In order to increase the power density of a fuel cell device it is desirable to make the clamping bar as thin as possible. However, a thinner clamping leads to less mechanical integrity and stiffness, which in turn gives a more uneven clamping pressure. The objectives of the improved clamping of this invention is thus to have thin clamping bar, while obtaining a uniform clamping pressure under the whole clamping bar area.

To obtain a high power density it is also desirable to make the clamping bar narrow. A narrower clamping bar also leads to that the diffusion of oxygen to the cathode is less hindered. If the clamping bar is narrow, the electrically conductive and porous media (e.g. a metal mesh) which is positioned between the clamping bar and the cathode GDL, needs to have a high mechanical integrity and stiffness in order to distribute the clamping force (provided by the clamping bar) uniformly over the whole cathode GDL area.

It should be noted that although a clamping bar is discussed, this clamping bar can have a significant width in comparison to its length and thickness, so that it can cover the whole cell area. If the clamping bar has a significant width it can be bent in two perpendicular directions, one being along the length of the bar and one perpendicular to that. The clamping bar can have one or several holes to improve the air access to the cathode. The clamping bar does not have to be electrically conducting.

In a fuel cell like the one shown in FIG. 9 (prior art), the pressure exerted by the clamping bar has a tendency to be uneven, since the clamping bar is fastened and tightened against the fuel cell by means of bolts at its ends. Thus the clamping pressure tends to be lower in the centre area of the clamping bar and higher towards the bolts. This is especially true when the clamping bar is thin in comparison to its length. For a PCB board as the one shown in FIG. 1, this problem becomes particularly notable when the clamping bar is longer than 20 mm.

The object of a further aspect of the present invention is to provide a solution to the problem of uneven clamping of fuel cells. This object is achieved by the clamping device as described below.

According to this invention a more uniform clamping can be accomplished through making the clamping device slightly arcuate. The clamping device of the invention is suitable for fuel cells which require clamping to reduce the internal resistance, such as the ones shown in FIGS. 1 and 2, or for fuel cells of the type described in PCT/SE2005/001514, as well as of other types.

Referring now to FIGS. 4a-4d, the clamping device comprises a clamping bar, which has end portions 43a-d and a centre portion 44a-e, and which is rather narrow in comparison to its length. The clamping plate is provided with means 41a-e, for receiving mounting elements, such as bolts or screws and nuts, snap connections, resilient couplings etc., for fastening and tightening the clamping device against the fuel cell at its end portions 43a-d, and has a bent or arcuate shape, such that the plane in which the bent centre portion is situated is on a distance from the plane of the end portions of the clamping bar. The clamping device is mounted in the fuel cell with the bent surface facing inwards the fuel cell, towards the mesh of the cathode current collector. In an un-tightened state, the centre portion 44a-e of the clamping bar will be in contact with the cathode current collector, while the end portions 43a-d will be on a distance from the cathode current collector. In the tightened state, the mounting means are tightened such that the desired clamping pressure is exerted by means of the mounting means at the end portions of the clamping bar. Due to the arcuate shape of the clamping bar, the centre portion 44a-e is pressed against the cathode current collector with a higher clamping pressure than would be the case with a straight, i.e. non-arcuate, clamping device.

In order to obtain an even clamping pressure, the clamping bar preferably has a higher bending resistance at the centre portion than at the end portions. This may be achieved in different ways according to the embodiments shown in FIGS. 4a-4d. In the embodiments of FIGS. 4a-4c the clamping plate 40a-c of the clamping device 4a-c has an elongated rectangular shape. The mounting means 41a-c are openings located at each end of the clamping bar. In the embodiment shown in FIG. 4a, the clamping bar 40a has a uniform thickness and is made of a material having a non-uniform material stiffness. Thereby the centre portion 44a has a higher stiffness than the end portions 43a, and accordingly a higher bending resistance, e.g. by incorporating reinforcements in the material of the clamping bar.

In the embodiment shown in FIG. 4b, the clamping bar 40b has a uniform material stiffness and a non-uniform thickness, such that the centre portion 44b has a higher thickness than the end portions 43b, and thus a higher bending resistance.

In the embodiment shown in FIG. 4c, the clamping bar 40c has a uniform thickness and a non-uniform arcuate shape, such that the centre portion 44c has a higher bending curve than the end portions 43c. In this embodiment the clamping bar has a parabolic shape, but other uneven curves, which result in higher bending resistance of the centre portion, may also be conceivable. By the parabolic shape of the clamping bar, the desired higher bending resistance of the centre portion can be easily obtained by simply bending a clamping bar of uniform thickness and material.

The embodiment shown in FIG. 4d differs from the embodiments of FIGS. 4a-4c in that the clamping bar is much wider, and much more resembles a clamping plate 40d. In this embodiment the width of the clamping bar substantially corresponds to the width of the fuel cell to which it is to be mounted. The clamping bar is thus rectangular or square and the means 41d for receiving mounting elements openings located at each corner portion of the plate 40d. If desired additional mounting bolts can be attached. The clamping bar is curved such that the centre portion 44d is bent in two perpendicular directions, along the length of the plate and along the width. The width of the clamping bar of this embodiment allows the clamping bar to cover the entire cell area.

If desired the shape of the clamping bar may be a combination of the shapes described above, that is, the clamping bar may have non-uniform material stiffness and/or non-uniform thickness and/or non-uniform arcuate shape.

The clamping bar may have one or several openings to improve the air access to the cathode, and it need not be electrically conducting.

Clamping Plate

In the prior art fuel cell shown in FIG. 9, the conductive mesh 202 (e.g. a gold plated stainless steel mesh) of the cathode current collector is flat and of a weak and flexible structure. As a result, the clamping force is highest right under the clamping bar and decreases towards the periphery of the net, in the direction perpendicular to the clamping bar.

In another aspect of this invention an additional solution to the problem of uneven clamping pressure is therefore provided. According to this aspect of the invention the gold mesh and the clamping bar are replaced by a clamping plate, which combines the features of the clamping bar and the mesh.

The clamping device shown in FIG. 4e device comprises a clamping plate 40e, which has a front side 47 and a back side 48. The front side is directed outwards, when mounted in the fuel cell, and is substantially flat. The back side is directed inwards the fuel cell, when mounted. The clamping plate comprises a solid portion 45 and an apertured portion 46. The apertured portion has a plurality of openings to provide gas access to and from the cathode oxygen electrode.

The solid portion 45 is preferably rectangular and functions as a frame which holds the apertured portion. The solid portion thus has an opening (a "window") in which the apertured portion 46 is positioned. This opening, and thereby the apertured portion, is located such that when the clamping device is mounted in the fuel cell, the apertured portion lands in the area of membrane electrode assembly (MEA) of the fuel cell. In the clamping device shown in FIG. 4e the apertured portion 46 is located on one side of the solid portion 45.

The apertured portion consists of a resilient material and is arcuate or curved such that a centre portion 44e of the apertured portion bulges in the direction of the back side 48. The curve of the apertured portion 46 can be shaped in the same way as any of embodiments of FIGS. 4a-4d, or a combination thereof. The resilient material chosen for the apertured portion must be flexible enough to form itself against the surface of the active are, but must at the same time be stiff enough to be able to exert a clamping force on the fuel cell components. The apertured portion may be a net structure, or a perforated or porous part. It may be of the same or of different material from the solid portion.

In one preferred embodiment the solid portion and the apertured portion are manufactured separately and then attached to each other. Thereby the apertured portion can be made of a different material from the solid portion. This is advantageous in cases where a non-resilient solid portion is desired.

In another preferred embodiment the solid portion and the apertured portion are manufactured as one integral part, both portions being of the same material. This simplifies the manufacture of the clamping device as the step of mounting the apertured portion in the solid portion is omitted.

The apertured portion 46 should have size such that it substantially covers the active area of the fuel cell (e.g. the gas diffusion layer, GDL). The material of the apertured portion can be highly electrically conductive or poorly conductive. If a material of poor conductivity is chosen, a highly conductive layer should preferably be a attached to the GDL, to improve the electrical conductivity and to improve the electrical contact in relation to the current collector of an adjacent cell anode.

Another design of the clamping device according to this aspect of the invention is suitable for use in a device as shown in FIG. 1a. In this design the clamping plate comprises a plurality of windows or apertured portions, corresponding to the positions of the fuel cells which are to be clamped by means of the clamping plate.

The clamping device of this aspect has the advantages of: Simplified construction, since the gold plated mesh and the clamping bar are replaced by a single component, and consequently fever steps of assembly of the fuel cell device and less risk for errors, e.g. misplacement of the components, and; Increased power density, since the use of clamping device of this aspect leads to a more compact design, which in turn gives a higher power density of the fuel cell device.

Another improvement of the described invention is to make the clamping plate of the above described clamping devices (shown in FIGS. 4a-4e) from a stiff and light material.

A suitable material is for example carbon, due to its low inherent contact resistance to the GDL of the cell. In one embodiment the clamping bar or clamping plate of the clamping device is made of carbon fibre net, carbon fibre cloth, carbon felt, pyrolysed polymer, or carbon paper, which is wholly or partially impregnated with a stiff binder, such as epoxy resin etc. in order to provide stiffness. In the case of partial impregnation, the clamping bar or plate may be produced by coating one side of the carbon substrate as indicated above with a wax composition, shaping the substrate to the desired arcuate shape, and then impregnating the carbon substrate with the binder, before removing the wax coating by chemical and/or heat treatment. In another embodiment the clamping bar or clamping plate is made of carbon fibre net, carbon fibre cloth, carbon felt, pyrolysed polymer or carbon paper which is wholly or partially impregnated with a pyrolysable polymer (phenolic resin etc.).

In yet another embodiment the clamping bar or clamping plate is made of a pyrolysed polymer that is preshaped in a mold and pyrolysed.

A pair of the above clamping devices can also be mounted on each side of a support plate in a fuel cell device as shown schematically in FIG. 1, so as to give a double sided fuel cell. The clamping bar can also be designed according to a combination of the above described embodiments.

The clamping plate can optionally be made hydrophobic, e.g. by application of a Teflon coating. However, care must be taken that the hydrophobic layer does not increase the electrical contact resistance to the adjacent components (e.g. GDL of the cathode or current collector or anode of an adjacent cell).

To provide a better electrical contact between the clamping plate and the metallic surface of the current collector of the anode of an adjacent cell, the clamping plate can be optionally coated with a metallic layer, by e.g. plasma spraying and/or vapour deposition methods. The metallic coating can cover the clamping plate wholly or partially.

In another embodiment the clamping plate is made from a electrically non-conducting, but stiff plastic material (e.g. hard PVC), which is coated on the side facing the GDL with an electrically conducting layer (e.g. metallic Cu or stainless steel). The advantage of this design is that plastic details are cheap to mass produce, and that the metal coating connects well to the metallic surface of the anode current collector of an adjacent cell, by clamping, or even by fusing or soldering. The risk of metal ions dissolving from the metal coating and poisoning the MEA can be overcome by the addition of a protective layer, such as gold, carbon or other protective and contact resistance reducing layer, used in fuel cell technology.

In an alternative embodiment, the bending strength of the clamping plate can also be achieved by introducing profiles into the clamping plate. Said profiles can have different depths so as to give, for example, higher strength in the middle.

Support Plate

In the prior art fuel cell shown in FIG. 9, a support plate is used, into which gas channels have been drilled, and to which gas capillaries are attached for the provision of hydrogen to the cell. The gas channels extend through the support plate and the connections of the gas channels to the gas capillaries are located at the side of the support plate. The support plate is typically made of a rigid material, such as plexiglass. The gas channels must have a diameter that exceeds the gas capillary diameter in order to allow connection. Therefore the thickness of the support plate must exceed the outer diameter of the gas capillaries, and thus amounts to several millimeters, e.g. 2-3 mm. The thickness of the support plate sets a limit to the power density of the fuel cell shown in FIG. 9.

There is a continuous ambition to obtain fuel cells with an increased power density, and thus there is a need for a fuel cell device having an increased power density.

One object of the invention is thus to provide a fuel cell device having increased power density. This object is achieved by the present invention, which provides for a very thin support plate.

The fuel cell support plate of the invention comprises at least three layers arranged in a sandwich construction, a first outer layer, an intermediate layer, and a second outer layer. A fuel inlet channel and a fuel outlet channel are comprised within the support plate sandwich construction. The fuel inlet channel is confined by an elongated aperture in an intermediate layer of the sandwich construction in combination with the surfaces of adjacent first and second outer layers. An inlet opening of the fuel channel to which a fuel supply, such as a gas capillary, can be connected, is arranged in the first outer layer in the area adjacent to one end of the elongated aperture of the intermediate layer. An outlet opening of the fuel channel is arranged in the second outer layer in the area adjacent to the other end of the elongated aperture. When the support plate is arranged in a fuel cell, the outlet opening of the fuel channel will be located in the area of the anode gas chamber, so that fuel can be conducted into the anode gas chamber. The fuel outlet channel provided in the support plate extends from the anode gas chamber to an outer opening in the support plate, for discharge of the fuel flow. The idea of the invention is thus to build up the support plate by sandwiching three or more thin layers, which are provided with apertures and openings, which together form the desired fuel channels. The fuel is preferably a gas, most preferable hydrogen gas.

The layers of the support plate are preferably made of a stiff material, in order to be able to counteract the bending force of a clamping bar or clamping plate, previously described. The pressure exposed by a clamping bar and clamping force may typically be 50 N/cm². For high power fuel cell devices the support plate materials should preferably also be heat tolerant, so as to withstand temperatures above 50° C. The materials of the support plate should preferably not release any gases that are harmful to the MEA of the fuel cell device. The support plate is preferably not electrically conducting.

According to the invention the layers may be made from polymer foil sheets, metal foil sheets, or polymer wax coated paper sheets laminated together. Each layer preferably have a thickness of between 0.1 and 1 mm. The support plate may comprise two or four or even more layers, laminated between the first and second outer layers. This is advantageous if it is desired to provide gas channels that lead in different directions or gas channels that cross each other. The layers of the support plate can be laminated with each other by hot sealing, by gluing or by using adhesive films.

In a preferred embodiment the support plate is provided with a fuel transfer channel, which extends through the support plate sandwich construction, between the first and second outer layers, so that fuel can be conducted from the anode gas chamber of one fuel cell to the anode gas chamber of another fuel cell, which is arranged on the opposite side of the support plate.

In FIG. 3 one preferred embodiment of the support plate is schematically shown. In this embodiment the support plate is adapted for gas supply to two fuel cell units arranged on opposite sides of the support plate. A view of such an arrangement is shown in FIG. 1*a*. In this embodiment the sandwich support plate comprises three layers: a first outer layer 309, an intermediate layer 310, and a second outer layer 311. Each layer includes an end plate portion 313, which has the form of a protruding tab. The current collector portion is adapted to insertion into a current collector contact, such as the one shown in FIG. 7.

In use fuel gas enters an inlet opening 301 located in the end plate portion 313 of the first outer layer, and is then conducted through a gas channel formed by elongated aperture 302 towards the gas channel outlet opening 303 which is a gas chamber inlet opening provided in the second outer layer, whereby the gas enters the anode gas chamber of the fuel cell device in which the support plate is arranged. The gas inlet channel is formed by an elongated aperture 302, which is provided in the intermediate layer, together with the surfaces of the first outer layer 309 and the second outer layer 311. The height of the gas channel thus coincides with the thickness of the intermediate layer. The width of the gas channel coincides with the width of the elongated aperture. The bottom and top walls of the gas channel are the first end second outer layers, respectively.

After having left the gas inlet channel, the fuel gas passes the anode gas chamber and exits through the opening 304 in the second outer layer. The intermediate layer and the first outer layer both have openings 305, 306 that coincide with the opening 304. These openings together form a fuel transfer channel for transfer of fuel gas to the anode gas chamber of the fuel cell arranged on the opposite side of the support plate. The gas thus enters the anode gas chamber of the opposite fuel cell through the opening 306, and exits the anode gas chamber through the opening 307, which is provided in the first outer layer 309, and exits the fuel cell device through a outlet channel 308, which is provided in the support plate in the same manner as the gas inlet channel.

By connecting a gas capillary to an inlet opening which is provided on a flat surface, the thickness of the support plate can be reduced to less than 1 mm.

Even though the openings and apertures of the layers of the support plate described above have a certain position and shape, which have certain advantages, it should be apparent that the scope of invention also includes support plates having gas openings differently located and apertures of other shapes and locations.

In this specific embodiment the end plate portion 313 has the form of a protruding tab, which simplifies the exchange of a used fuel cell device for a fresh one. However, it may be desirable to shape the current collector portion differently, e.g. by merely extending the width of the support plate layers.

In an alternative embodiment of the present invention, part of the support-plate is integrated in the casing of a device. The top part of the support plate (the layer closest to the fuel cell), is integrated with the fuel cell components (that is the MEAs, GDLs and conducting foils/tape components), except for those in the clamping. The clamping consists of a clamping plate including apertured portions.

When in use, the said top-part is attached to the casing by means of an adhesive. The said top-part is thereby easy to exchange after its service life. FIG. 10 illustrates how this embodiment can be used.

FIG. 10a is the top layer view. This layer includes a clamping plate (920), having apertured portions (921) for air access.

FIG. 10b is the middle layer view. This layer includes the MEAs, GDLs and the conductive tape. The squares (922) illustrate the relative size of the GDL and active area. Underneath the fuel cell components is a support layer (923), having holes (924) for hydrogen gas access. The support plate should be so large that it covers the gas in/out and the channels at the bottom layer.

FIG. 10c is the bottom layer view. This layer can be integrated with the casing of a device (for example a molded plastic casing). This layer has a gas inlet hole (925) and a gas outlet hole (926). Between them is a grooved pattern (927) for hydrogen gas flow. The said pattern can also be interrupted so that the gas is forced through the cells.

It is important that the interface between the middle layer and the bottom layer is gas-tight. This can be accomplished by using an adhesive and/or clamping force.

Gas Connection

In the prior art fuel cell device the fuel (e.g. hydrogen gas) enters the support plate through the short end of the plate. With this solution the gas inlet opening in the support plate must be able to receive the tip of a gas capillary, which implies a thickness of the support plate that exceeds the outer diameter of the gas capillary. It would be advantageous to find an alternative way to provide the fuel cell device with gas, which would allow the use of a thinner support plate.

According to the invention a gas connection means is provided which allows the fuel gas to enter the fuel cell device on a flat surface, instead of short side of the support plate. The gas connector means receives the gas capillary tip, and no demands are made on the support plate thickness. This arrangement also allows feeding of fuel gas through a current collector contact component as described below. The gas connection means may be used in connection with the embodiments of the fuel cell device shown in FIG. 1.

In an alternative embodiment the gas connector means is instead placed in the push-in contact, i.e. the fuel cell device has an inlet opening 301 in the end plate portion as illustrated in FIG. 3. When the device is pushed into the current collector contact 802 (see FIG. 8) the opening is positioned so that a seal 812 (e.g. an o-ring or a circular silicon seal) in the contact, having a spring force that ensures gas tightness, surrounds the opening.

Yet another embodiment of the gas connector means 500 is displayed in FIGS. 5 and 6. The gas connector means comprises a resilient sealing component 503, arranged between the support plate 511 and an outer component 501. The components 503, 501 of the gas connector means are attached to each other and to the support plate by means of contact layers 502, 504, made of adhesive or glue, which ensure gas tightness and mechanical integrity of the gas connector. The resilient sealing component 503 is preferably made of silicon rubber or any other elastic polymer, having an opening 507 in its centre. The diameter of the opening 507 is smaller than the outer diameter of the gas capillary 508, which is to be connected to the fuel cell device. The elastic properties of the sealing component ensure gas tight connection of the gas capillary.

The components 503, 501 are arranged on the support plate, such that the gas inlet opening 505 of the support plate and the openings 507, 506 of the components coincide and form a short inlet connection channel 607 (see FIG. 6a), into which the gas capillary is to be inserted. The diameter of the openings 505, 506 of the support plate and the outer component is the same as the outer diameter of the gas capillary 508 being connected. The outer component is preferably made of a non-resilient material, most preferably of the same plastic material as the support plate. The purpose of the top layer is to steer insertion angle of the gas capillary so that it is inserted perpendicularly (or in another desired angle) to the support plate when being connected.

The top layer is advantageously significantly larger than the silicon rubber plate so that a peripheral portion thereof can be attached directly to the support plate. This design enhances the mechanical integrity of the gas connector means.

In one preferred embodiment shown in FIGS. 6a and 6b the outer component 601 is directly attached to the support plate 611 by means of an adhesive, glueing or hot pressing to provide improved mechanical integrity of the fuel connector means.

Current Collector Contact

In the prior art fuel cell device shown in FIG. 1 the end current collectors of the fuel cell device are placed at different positions on a distance from each other, which complicates the connection of the current leads from the end current collectors. The present invention aims at providing a simplified solution for connection of the current collectors of the fuel cell device to e.g. the power electronics of the micro fuel cell system.

The embodiments of the fuel cell device of the invention shown in FIG. 1a, b comprises series connected cells arranged on a support plate. The support plate has a protruding current collector end plate, as described above, which is adapted for connection to a current collector contact.

FIG. 7a-c shows one embodiments of such a current collector contact 702. The current collector contact is designed as an elongated push-in contact. Attachment portions 701 having openings 708 for a fastening means are provided at each end of the contact. The contact comprises a contact recess 703, which extends along the contact 702. The contact recess preferably has the form of a longitudinal slit, having a flat bottom surface 707. Inside the contact recess 703, contact means 704 are arranged as shown in FIG. 7c. The contact means are preferably resilient metal tongues, which ensure sufficient contact pressure by means of a spring force exerted by the contact means 704 on the end plate portion 113 of the support plate. Advantageously, the contact tongues have a coating that decreases the contact resistance, e.g. a gold coating. A plurality of contact means 704 are preferably provided in the contact recess 703 and are arranged on opposite sides of the contact recess, so as to obtain an even contact pressure and secure contact.

The end plate portion (313 in FIG. 3) of the support plate, on which the fuel cells are arranged, is to be inserted into the contact recess 703, and therefore, the dimensions of the contact recess must be chosen such that the contact recess can accommodate the end plate portion. The contact arrangement of the fuel cell device thus includes the end plate portion of the support plate (male contact) and the current collector contact (female contact).

A preferred embodiment is to provide a gas connection 709 in the current collector contact, so that a fuel cell device having a gas connector means 500 (as shown in FIGS. 5-6) arranged on the end plate portion 313 of the support plate can be connected to the a fuel gas supply. The gas connection 709 is then arranged so as to automatically fit to the gas connector means 500 of the fuel cell device. Thereby, the current collector contact function and the provision of gas to the fuel cell device can be accomplished by means of the same component, thus further simplifying the construction of the device.

A particularly advantageous option the gas connector means is instead placed in the push-in contact, i.e. the fuel cell device has an inlet opening 301 in the end plate portion as illustrated in FIG. 3. When the device is pushed into the current collector contact 802 (see FIG. 8) the opening is positioned so that a seal 812 (e.g. an o-ring or a circular silicon seal) in the contact, having a spring force that ensures gas tightness, surrounds the opening.

According to the present invention, the cells can be positioned in a number of different configurations. Subsequent cells can be positioned for example as a 'U' or an 'O' (circle) shaped design. One preferred configuration is to position four cells in a square configuration. (This is exemplified in Example 2)

In this configuration, the clamping may be provided not only at the periphery of the clamping plate or support plate, but it can also be positioned in the middle of the support plate.

Operating the Fuel Cell Device in Cold Environment

The fuel cell device as the one shown in FIG. 9 is sensitive to the temperature of the surrounding environment. If the temperature is close to or below 0?C it is difficult to obtain a high power from the device, since the catalytic reactions and the proton conductivity inside the fuel cell device is temperature sensitive. Furthermore, if the device is operated at temperatures close to or below 0?C, there can be a problem the water (in condensed form) being formed during the use of the fuel cell device which may lead to decreased performance. There is thus a need for being able to keep the fuel cell device at a temperature which is higher than the surrounding environment.

This problem can be solved by an improvement of the of the fuel cell device by attaching an electrical heating element to the back side of the support plate by e.g. adhesive means. The heating element can be used before and during start-up of the fuel cell device to heat up the MEA so that the fuel cell device can deliver more power and thus more heat for continued operation. During operation the heating element can optionally be kept turned on to ensure that water is not condensed in an unwanted fashion. During shut-down of the fuel cell device the heating element can heat the cell in order to dry out the cell properly.

Another improvement of the present invention regarding operation in cold environment is to attach a thermally insulating but porous sheet outside of the cathode clamping plate or clamping bar. This cover sheet can for example be made of a porous polymer sheet, for example porous Teflon. In the case of a double sided fuel cell device the cover sheet can be made as a pocket into which the fuel cell device is placed.

The invention will be further illustrated by way of the following non-limiting Examples.

Example 1

4-Cell Unit with Steel Plate

In this example, a 4 cell unit, each cell having a 2.1 cm$^2$ active surface is assembled. The polarization curve data is presented in the table below as Example 1. The clamping means of this fuel cell was a 1 mm thick steel plate, having rectangular holes that are the same size as the Gas Diffusion Layer (GDL), which is 15 mm by 14 mm. Centered over the holes but electrically insulated from the steel plate by means of a double-sided adhesive, four gold-plated steel nets of 17 mm by 23 mm and having a mesh of 650 holes per cm was also used. The Membrane Electrode Assemblies (MEAs) were Primea 58 from Gore (0.4 mg Pt cm$^{-2}$ cathode, 0.4 mg Pt cm$^{-2}$ anode, 18 μm thick membrane).

The GDL were Carbel products from Gore, with their micro-porous side turned towards the MEA.

To form the steel plate, we start off with three Plastic sheets, each 0.8 mm thick. These three sheets will be labeled as the top, middle and bottom layer. We then cut out holes according to a printed template on these sheets. These holes will form the channel by which the hydrogen gas reaches the cell. The holes in the bottom layer are used for external gas connections. Using double-sided tape supplied by TESA, we attach this tape to both sides of the middle layer, with holes and channels cut through this tape as well, and then attach it to both the top and bottom layer, hence ending up with a three-layered support plate "sandwich". A double-sided non-conductive adhesive tape from 3M was then stuck on the sandwich, completely covering its upper-most surface, and thereby closing the originally opened channels. The protective layer on the top layer's surface was then peeled off, whereupon the copper foil supplied by TESA (product No. 4384) was adhered, with the electrically conductive adhesive facing away from the support plate, thus forming the anode current collector. Holes were then cut to form the gas-in and gas-out channels for each cell.

The fuel cell components (MEAs, GDLs, and conductive tape) are positioned as described in FIG. 2a.

We use 4 pieces of MEA were of dimensions 20 mm by 21 mm. The MEA and the GDL were hot-pressed at 120° C. to stick them together. Then, after the removal of the upper-most protective layer of the copper, the MEA/GDL piece was centered so as to cover the gas-in and gas-out holes, and gently stuck onto the anode copper foil. The dimensions of this backing determine the active area of each cell in this 4-unit cell, namely 2.1 cm$^2$ per cell. The surface of the MEA not covering the backing was then sealed against the anode copper foil by softly wiping the MEA down with e.g. a smooth Teflon piece.

The clamping for this four-cell unit comes from two steel plates, each 1 mm thick, having dimensions larger than the support plate. A non-conductive adhesive tape is then pasted to electrically insulate the gold-plated steel net from the steel plates. We then attach the three-layered, four cell unit to the steel plate, and screw both the steel plates together, by inserting screws into holes that were milled in the steel plate earlier, to achieve the clamping pressure required. Pure and dry hydrogen was used at the anode, while the cathode was in contact with still air atmosphere. The hydrogen flow was controlled by a mass flow meter (Brooks Instruments). The current density was controlled by means of a load cell (TTI, LD300).

Example 2

4-Cell Unit with Cells Situated in a Square

In another example, a 4 cell unit with cells situated in a square of dimensions 60 mm by 40 mm was assembled and tested. The clamping of this example is different to Example 1 because here the clamping occurs in the center of the square, by means of a screw. Also, the cathode side of the clamping is a casing of a stiff plastic box, having a flat inner surface, which is larger than the support plate.

The gold-plated steel net and double-sided adhesive was also used in this example in a similar way as the previous one. The components, like the MEA and the GDL, and assembly of this example were similar to the one previously mentioned, except that the gas flow channels were designed differently, in a manner befitting the square structure. Another difference between this example and the one listed above is the total active area of the fuel cells; in this case it is 5.28 cm$^2$, which is lesser than Example 1.

The polarization curve data is presented below as Example 2.

Example 3

4-Cell Unit with a Curved Surface

This example is a four-cell device similar to Example 1 and in fact has an identical active area surface of 2.1 cm$^2$ per cell too. The gold-plated steel net and double-sided adhesive was also used in this example in a similar way as the previous two. However, there lie two major differences between the first example and this one. Firstly, the cells are produced on a curved support plate surface, of outer diameter 36 mm. The assembly of the cell is done like in the earlier cases, but this time the MEA and GDL is wrapped around a curved surface and are hence arced too. The clamping on the cathode side was a thin stainless steel foil of thickness 0.05 mm, which was strapped down over the curved surface. And secondly, the MEA used in this example is Primea 5710 from Gore (0.4 mg Pt cm$^{-2}$ cathode and 0.1 mg Pt cm$^{-2}$ anode, 18 µm thick membrane).

The polarization curve data is presented below as Example 3.

|  | Typical Cell Voltage Out (V) | | | | | | |
|---|---|---|---|---|---|---|---|
| Current (mA) | 0 | 25 | 50 | 250 | 500 | 750 | 1000 |
| Example 1 | 0.9 | 0.85 | 0.81 | 0.68 | 0.62 | 0.57 | 0.55 |
| Example 2 | 0.9 | 0.82 | 0.79 | 0.64 | 0.33 | | |
| Example 3 | 0.9 | 0.82 | 0.77 | 0.59 | 0.49 | 0.41 | |

MEA: Primea 58, 2.1 cm2 active surface
MEA: Primea 58, 1.32 cm2 active surface
MEA: Primea 5710 (different loads), 2.1 cm2 active surface

The invention claimed is:

1. A planar configuration air breathing polymer electrolyte electrochemical device comprising:
   a support plate; and
   at least two air breathing polymer electrolyte fuel cells arranged in series connection on one surface of the support plate,
   wherein each of said air breathing polymer electrolyte fuel cells comprises:
   a. an anode current collector,
   b. a cathode current collector, and
   c. a membrane electrode assembly, which comprises a solid ion conducting polymer membrane electrolyte, an anode, an anode gas backing, a cathode and a cathode gas backing,
   and wherein:
   the support plate comprises at least three layers in a sandwich structure,
   the at least three layers comprise a first outer layer, a middle layer, and a second outer layer,
   the first outer layer forms a gas inlet,
   the second outer layer forms one or more gas openings,
   the middle layer forms one or more gas channels,
   the one or more gas openings formed by the second outer layer include:
   a first-cell outlet configured to conduct fuel out of a first fuel cell of the at least two fuel cells, and
   a second-cell inlet configured to conduct fuel into a second fuel cell of the at least two fuel cells, and
   one of the one or more gas channels is configured to conduct fuel from the first-cell outlet to the second-cell inlet.

2. The device of claim 1, wherein the at least three layers are flexible.

3. The device of claim 1, wherein the at least three layers are laminated together by gluing, by hot sealing, or by using adhesive films.

4. The device of claim 1, wherein the second fuel cell is configured to receive fuel only through the one of the one or more gas channels.

5. The device of claim 1, wherein the at least three layers include material selected from polymer foil sheets, metal foil sheets, or polymer wax coated paper sheets.

6. The device of claim 5, wherein the at least three layers are laminated together by gluing, by hot sealing, or by using adhesive films.

7. A planar configuration air breathing polymer electrolyte electrochemical device comprising:
   a support plate; and
   at least two air breathing polymer electrolyte fuel cells arranged in series connection on one surface of the support plate,
   wherein each of said air breathing polymer electrolyte fuel cells comprises:
   a. an anode current collector,
   b. a cathode current collector, and
   c. a membrane electrode assembly, which comprises a solid ion conducting polymer membrane electrolyte, an anode, an anode gas backing, a cathode and a cathode gas backing,
   wherein:
   the membrane electrode assembly is arranged between the anode current collector and the cathode current collector, such that the anode gas backing is directed towards and attached to the anode current collector and the cathode gas backing is directed towards and attached to the cathode current collector, and
   the membrane electrode assembly is attached to the anode current collector, and wherein:
   the support plate comprises at least three flexible layers in a sandwich structure,
   the at least three flexible layers comprise a first outer layer, a middle layer, and a second outer layer,
   the first outer layer forms a gas inlet,
   the second outer layer forms one or more gas openings,
   the middle layer forms one or more gas channels,
   the one or more gas openings formed by the second outer layer include:
   a first-cell outlet configured to conduct fuel out of a first fuel cell of the at least two fuel cells, and
   a second-cell inlet configured to conduct fuel into a second fuel cell of the at least two fuel cells, and
   one of the one or more gas channels is configured to conduct fuel from the first-cell outlet to the second-cell inlet.

8. The device of claim 7, wherein the at least three layers are laminated together by gluing, by hot sealing, or by using adhesive films.

9. The device of claim 7, wherein:
- the one or more gas openings formed by the second outer layer further include a first-cell inlet configured to conduct fuel into the first fuel cell;
- the one of the one or more gas channels is a first gas channel; and
- a second gas channel of the one or more gas channels, different from the first gas channel, is configured to conduct fuel from the gas inlet to the first-cell inlet.

10. The device of claim 7, wherein the second fuel cell is configured to receive fuel only through the one of the one or more gas channels.

11. The device of claim 7, wherein the at least three layers include material selected from polymer foil sheets, metal foil sheets, or polymer wax coated paper sheets.

12. The device of claim 11, wherein the at least three layers are laminated together by gluing, by hot sealing, or by using adhesive films.

13. The device of claim 7, wherein at least one of the at least three layers includes polymer foil sheets.

14. The device of claim 13, wherein the at least three layers are laminated together using adhesive films.

15. A planar configuration air breathing polymer electrolyte electrochemical device comprising:
- a support plate; and
- at least two air breathing polymer electrolyte fuel cells arranged in series connection on one surface of the support plate,
- wherein each of said air breathing polymer electrolyte fuel cells comprises:
  - a. an anode current collector,
  - b. a cathode current collector, and
  - c. a membrane electrode assembly, which comprises a solid ion conducting polymer membrane electrolyte, an anode, an anode gas backing, a cathode and a cathode gas backing,
- wherein:
  - the membrane electrode assembly is arranged between the anode current collector and the cathode current collector, such that the anode gas backing is directed towards and attached to the anode current collector and the cathode gas backing is directed towards and attached to the cathode current collector, and
  - the membrane electrode assembly is attached directly to the anode current collector by an adhesive, wherein the adhesive covers a first region, adjacent and corresponding to the anode gas backing, and a second region, which surrounds the first region, thereby creating a seal between the membrane electrode assembly and the anode current collector, and thus creating an anode gas chamber, said adhesive being electrically conductive in at least said first region,
- and wherein:
  - the support plate comprises at least three layers in a sandwich structure, comprising a first outer layer, a middle layer, and a second outer layer,
  - the at least three layers are made from polymer foil sheets, metal foil sheets, or polymer wax coated paper sheets,
  - the at least three layers are laminated together by gluing, by hot sealing, or by using adhesive films,
  - the first outer layer forms a gas inlet,
  - the second outer layer forms one or more gas openings,
  - the middle layer forms one or more gas channels,
  - the one or more gas openings formed by the second outer layer include:
    - a first-cell outlet configured to conduct fuel out of a first fuel cell of the at least two fuel cells, and
    - a second-cell inlet configured to conduct fuel into a second fuel cell of the at least two fuel cells, and
  - one of the one or more gas channels is configured to conduct fuel from the first-cell outlet to the second-cell inlet.

16. The device of claim 15, wherein gas connection means is provided at one end of the support plate.

17. The device of claim 15, wherein each of the at least three layers has a thickness of 0.1 mm to 1 mm.

18. The device of claim 15, wherein the gas channels include elongated apertures.

19. The device of claim 15, wherein the one or more gas openings are configured to be positioned adjacent to the anode gas chamber.

20. The device of claim 15, wherein:
- the one or more gas openings formed by the second outer layer further include a first-cell inlet configured to conduct fuel into the first fuel cell;
- the one of the one or more gas channels is a first gas channel; and
- a second gas channel of the one or more gas channels, different from the first gas channel, is configured to conduct fuel from the gas inlet to the first-cell inlet.

21. The device of claim 15, wherein the second fuel cell is configured to receive fuel only through the one of the one or more gas channels.

22. The device of claim 15, wherein the fuel cells are arranged to press against a bearing plate, which includes gas permeable portions located in an area of each fuel cell.

23. The device of claim 22, wherein the bearing plate is an arcuate or curved casing of a product.

* * * * *